(12) United States Patent
Wilkes et al.

(10) Patent No.: US 6,438,124 B1
(45) Date of Patent: *Aug. 20, 2002

(54) VOICE INTERNET TRANSMISSION SYSTEM

(75) Inventors: T. Clay Wilkes, Austin; Alex Radulovic, Round Rock, both of TX (US)

(73) Assignee: I-Link, Inc., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,665

(22) Filed: Jul. 22, 1998

Related U.S. Application Data

(63) Continuation of application No. 08/599,238, filed on Feb. 9, 1996, now abandoned.

(51) Int. Cl.[7] .............................................. H04L 12/66
(52) U.S. Cl. ...................................... 370/352; 370/401
(58) Field of Search .................................. 370/389, 400, 370/401, 402, 403, 404, 353, 352, 354; 379/201, 202, 211, 212; 395/200.01, 200.02, 200.17

(56) References Cited

U.S. PATENT DOCUMENTS

| | | | | |
|---|---|---|---|---|
| 5,471,470 A | * | 11/1995 | Sharma et al. | |
| 5,726,984 A | * | 3/1998 | Kubler et al. | |
| 5,864,610 A | * | 1/1999 | Ronen | |
| 5,943,399 A | * | 8/1999 | Bannister et al. | |
| 6,067,350 A | * | 5/2000 | Gordon | |

* cited by examiner

*Primary Examiner*—Douglas Olms
*Assistant Examiner*—Ken Vanderpuye
(74) *Attorney, Agent, or Firm*—Morriss, Bateman O'Bryant & Compagni

(57) ABSTRACT

A voice Internet transmission system which enables a person to have a conversation via the Internet without having to use a computer at either end of the conversation, and without incurring long distance telephone charges regardless of the distance between those having the conversation. In a preferred embodiment, the apparatus consists of two non-Internet capable devices being enabled to connect to the Internet and either in duplex or simplex mode transmit packets of Internet formatted data comprising digitized, compressed and encrypted conversation between the devices. In other words, a person can pick up an ordinary telephone and converse with another person, regardless of the distance between them, without incurring long distance telephone charges. No special telephone is required, nor is a computer running special software. The apparatus which makes this possible is a system of Internet access nodes or VoiceEngines. These local Internet VoiceEngines provide digitized, compressed, and encrypted duplex or simplex Internet voice/sound.

44 Claims, 12 Drawing Sheets

Send

Receive

VOICE INTERNET TRANSMISSION SYSTEM

This application is a continuation of application Ser. No. 08/599,238, filed Feb. 9, 1996, now abandoned.

BACKGROUND OF THE INVENTION

1. Field of the Invention

This invention pertains generally to communication between devices which are not Internet-ready because they lack the ability to transmit information using the required Internet communication protocols. More specifically, this invention enables voice communication using a telephone where the voice signals are transmitted via the Internet as opposed to using conventional long-distance switched telephone network lines.

2. State of the Art

One of the drawbacks of trying to bring diverse technologies together is that they often do not share a common hardware foundation for their structure. This is especially true in communication technologies which typically have proprietary protocols by which data is formatted for transmission, as well as an incompatible hardware structure over which the data travels. Yet it can be the case where each of the diverse technologies offers advantages over others.

Two technologies which share the common goal of providing a conduit for communication are publicly switched telephone networks (PSTNs) and the Internet. It is well known that a telephone is typically a voice communication device, but there have been successful attempts to meld facsimile and modem data communication over the same telephone lines. In contrast, the Internet until recently has been dedicated to computer data communication exclusively. Yet these technologies both have desirable characteristics (reliable and simple voice communication versus reliable and rapid computer data transmission around the world with no long-distance telephone charges) which the other technology is being crafted to crudely exploit despite the drawbacks inherent in forcing a communication technology upon a transmission medium for which it was not specifically designed.

For example, computer data transmission via a PSTN is successfully if not slowly accomplished via a computer equipped with a modem coupled to a PSTN line. Such a computer can access another computer so equipped in order to exchange information directly. The extreme disadvantage is that the caller must bear long distance telephone charges if the computers are located further apart than a local telephone call away from each other.

A slight improvement in computer data transmissions via PSTNs occurred when large services which are accessed via modem began to provide local telephone access. This was accomplished by providing local telephone numbers around many major population centers which would in turn access the service. By negotiating bulk contracts for long distance telephone rates, the service provided a way by which it could be reached without incurring the long distance telephone charges.

Despite this improvement, however, there are several drawbacks in using PSTNs to transfer computer data. For example, one of the most important limitations is that speed of data transmission is inherently inferior to dedicated computer network speeds.

As stated earlier, however, the Internet provides some unique advantages which PSTNs cannot because of the very nature of the physical transmission medium which comprises the Internet. To understand these advantages, it helps to understand some of the background behind the development of the Internet.

The military has always recognized the importance of maintaining communication lines open in all circumstances, especially in times of war. The interest of the government was so keen that it launched the DARPA project. DARPA consisted of a computer network which did not rely on any single node or cable for its existence. On the contrary, it was specifically designed to provide multiple pathways for communication to flow from a source to a destination. In this way, data can be routed along a large variety of pathways. Successful transmission of a message does not have to rely on any single pathway for the majority of the message to reach its destination. The successor to the DARPA project is now the better known and widely used Internet.

One more important distinction between a PSTN and the Internet which should be recognized is that a PSTN is typically an analog data transmission medium, whereas the Internet only transmits digital data. Despite the fact that a PSTN can in some circumstances transmit digital data, transmitting digital computer data via a PSTN typically requires translation of the data into frequency modulated analog signals. Likewise, transmitting analog voice data via the Internet requires translation of the data a digital format.

Transmitting voice data via the Internet is feasible not only because voice data can be digitized, but like PSTNs, it is a global transmission medium which substantially duplicates the PSTNs area of coverage. The motivating factor providing impetus for improving voice transmission via the Internet, however, originates with the cost structure associated with using the Internet. As is well known, a long distance telephone call incurs long distance telephone charges. In contrast, the Internet does not have long distance communication charges associated with it. This is the key to the desirability of expanding the capabilities of the Internet.

This simple cost/benefit analysis has not escaped the attention of various commercial entities trying to exploit the Internet. It is only recently, however, that commercial efforts have become viable. The reason for this viability is that the growth in the number of Internet users has grown substantially in a very short time. Our television advertising and printed media sponsors and commercial entities now often bear World Wide Web URL addresses which an Internet user can access with sophisticated but easy to use software tools. The Internet is increasingly pervasive in every-day life because the number of people using it has increased as the ability to use and access the Internet has also increased.

Providing voice transmission capabilities via the Internet has focused exclusively to date on computer users running software on a computer which has the essential accessories. These accessories are software to digitize sound and a microphone for receiving the sound to be digitized. It seems only logical that a computer serve as the conduit by which the Internet is accessed because that is the only way that the Internet is useable. The importance of that statement lies in the specific communication requirements for a device which is to communicate with other devices via the Internet. That is to say, all devices which communicate via the Internet do so using Internet communication protocols. Internet communication protocols are methods of creating packets of digital data suitable for transmission via the Internet. A person skilled in the art will recognize that the most common Internet communication protocol is the Transport Connect Protocol/Internet Protocol, or TCP/IP. In essence, a device which communicates via the Internet is a TCP/IP capable device.

In light of this background, it would be an advantage over the state of the art to be able to provide a method and apparatus for transmitting voice data via the Internet without having to have a computer which is TCP/IP capable. That is to say, it would be an advantage to talk to another person who is normally a long distance telephone call away without incurring long distance telephone charges and without requiring a computer at either end of the transmission.

OBJECTS AND SUMMARY OF THE INVENTION

It is an object of the present invention to provide a method and apparatus for transmitting digitized sound between devices via the Internet even the devices are not capable of digitizing sound or transmitting the sound using the appropriate Internet communication protocols.

It is another object of the invention to provide a method and apparatus for transmitting digitized sound between devices, either of which is not capable of digitizing sound or transmitting the sound using the appropriate Internet communication protocols.

Still another object of the present invention is to provide a method and apparatus for talking via the Internet over a distance which would normally incur long distance telephone charges.

A further object of the invention is to avoid the complexity of present voice Internet transmissions system which require the use of a computer and specialized software.

Yet another object of the present invention is to provide a method and apparatus for conversing long distances which is available to anyone with a telephone.

Still yet another object is to provide the method and apparatus at a reduced cost as compared to present long distance telephone rates for a conversation between parties.

Another object of the method and apparatus is to create a system whereby the limitations of computer implemented voice Internet transmissions is avoided, such as reduced sound quality.

These and other objects of the present invention are provided in a voice Internet transmission system which enables a person to have a conversation via the Internet without having to use a computer at either end of the conversation, and without incurring long distance telephone charges regardless of the distance between those having the conversation. Worded in its broadest terms, the apparatus consists of two non-TCP/IP devices being enabled to connect to the Internet and bi-directionally transmit packets of TCP/IP data comprising digitized conversation between the devices. In other words, a person can pick up an ordinary telephone and converse with another person, regardless of the distance between them, without incurring long distance telephone charges. No special telephone is required, nor a computer running special software. The apparatus which makes this possible is a system of Internet access nodes or engines. These local Internet access engines provide digitizing and bi-directional Internet communication services.

Preferably, a user dials the telephone number of an Internet access engine which is local to the user. If not local, the user dials an Internet access engine which incurs the smallest long distance telephone charge. After connecting to the engine, the user then inputs the destination telephone number as if dialing direct. The local Internet access engine locates and then communicates with a second Internet access engine which is local to the destination telephone number, or locates an engine which will incur the smallest long distance telephone charges when completing the call. This second Internet access engine dials the destination telephone number, and a conversation can commence. The voices are digitized and transmitted via the Internet. This method and apparatus avoids any complexity for the user. Furthermore, it substantially increases the number of users which can take advantage of the present invention. Instead of limiting voice communication to those who have computers with microphones, anyone with a telephone can now avoid long distance telephone charges.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
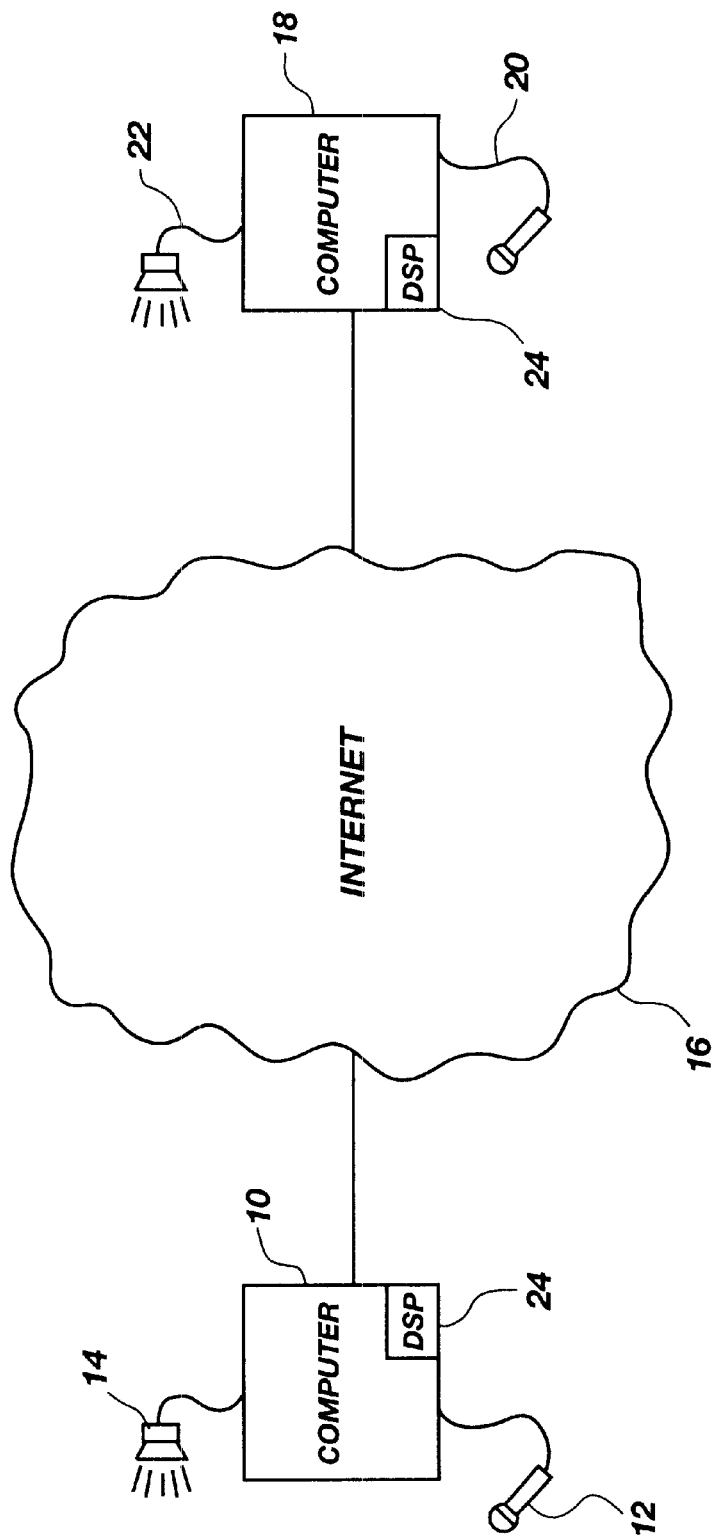
FIG. 1. is a block diagram of the components of a state of the art voice Internet transmission system.

When describing the present state of the art, it invariably involves a user running software on a personal computer which is connected to the Internet. As shown in FIG. 1, the state of the art comprises a computer 10 having a microphone 12 and speaker 14. The computer 10 is typically connected to the Internet 16 via a local access provider (not shown). The other party to the conversation must have a similar computer system 18 also having a microphone 20 and speaker 22, and coupled to the Internet through its Internet provider (not shown). These computers 10, 18 come equipped to communicate over the Internet using specification communication protocols designed for Internet use. That is, they communicate via the Internet by creating small packets of digital information. These packets are transmitted to a destination where the packets are integrated into cohesive data identical to the original data before being split into packets.

Internal to the computers 10, 18 is a digital signal processor 24 (DSP) for translating analog voice data into digital data, and vice versa. The DSP 24 is implemented in software because a general purpose computer is being used to run the program. Therefore, no specialized hardware to increase the throughput for the process is implemented.

There are several significant drawbacks which presently plague the state of the art and prevent more ubiquitous usage of the Internet as a telephone transmission medium. For example, the state of the art requires planning ahead of time. This is because present systems such as the one illustrated in FIG. 1 do not allow a phone call to any other device except another computer. Therefore, the person you want to call must not only have the same telephone software running on a computer, but must also call into the Internet at the same time in order to complete the connection. Therefore, the system cannot alert the intended receiver of an incoming call. The call must be anticipated. For this reason, it is often the case that to get both parties on the Internet at the same time, the first caller must place a regular long distance telephone call to the person with whom the first caller desires to speak.

As can be seen, this process quickly degenerates into an inconvenience for the users. The fact that a regular phone call must be placed also works against the calling party because the most expensive minute of a long distance telephone call is the first. Even if the call is only 2 seconds in length and the caller says nothing more than, "Get on the Net", the costs of the first minute are incurred. While for most calls this is not terribly significant, calls to locations around the globe can be more than trivial.

Another drawback to the state of the art is that the sound quality is poor at best. This is owing to the compression which must always be performed on the digitized voice data. Compression is required to speed up the process so the amount of data to be transferred can be handled by a typical 14.4 modem so that the voice transmission occurs in real time.

Still another drawback is that because both computers must be on the Internet. If for some reason their Internet provider is down or more likely all the ports into a computer are busy, the call cannot be completed until a line becomes free.

Some voice Internet systems also require both parties to have an email address. The email address serves as a unique identifier of the person to be called which is also known to the Internet. This limits use of this particular system strictly to people who already have Internet access through their own Internet access provider.

As a recent newspaper article says, at present, the state of the art is relegated mainly to hobbyists who like to take advantage of the novelty of making telephone calls for free using their computer and Internet access. However, regular usage of Internet phone software appears to be limited to around 20,000 people at present.

Stated succinctly, the present invention enables a subscriber of the present invention to avoid long distance telephone charges which are normally incurred when having a spoken conversation over long distances via a switched telephone network. However, unlike the systems described above, the present invention is much less complicated for the user, is more convenient, improves sound quality, and doesn't require advance notice of use.

Figure 2:
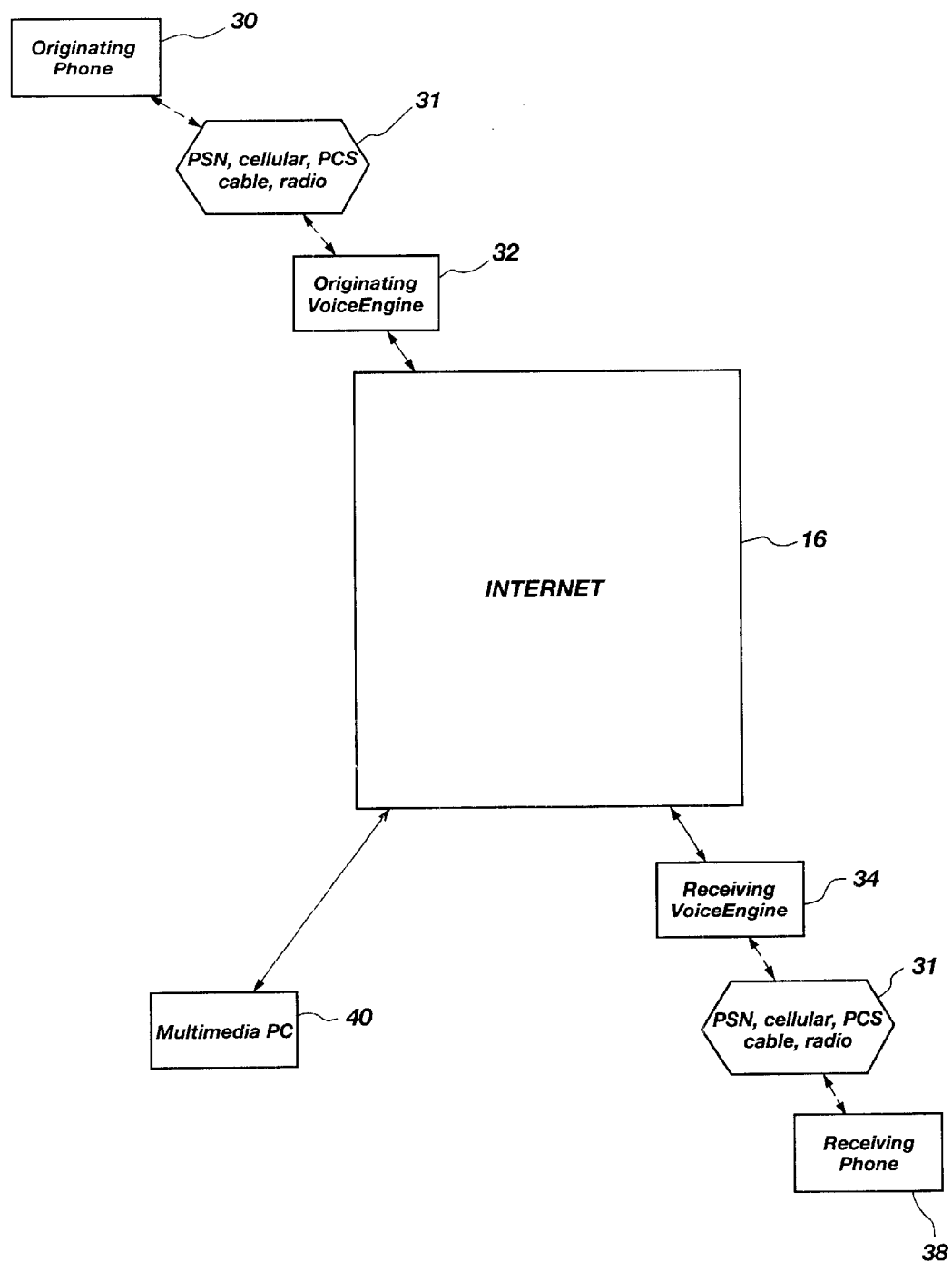
FIG. 2 is a block diagram of the apparatus arranged in accordance with the principles of the present invention.

These objectives are accomplished by the apparatus shown in FIG. 2. The present invention diverges significantly from the other systems in that non-Internet capable devices are able to communicate via the Internet. Thus, the present invention provides a very different and more advantageous telephone services as opposed to the computer telephones of the state of the art.

The advantages become apparent after walking through the system components of a preferred embodiment. At the caller's side, a typical telephone 30 is used. This is in stark contrast to the state of the art which has only implemented the calling device as another computer with microphone and speaker. The advantages are immediately obvious. No complicated software to set up and run. No external microphone or speakers to purchase for a computer.

The telephone 30 is used to call an originating VoiceEngine 32 (audio engine) via, for example but not limited to, a publicly or privately switched telephone network (PSTN), a cellular switch, PCS, cable telephone or radio 31. Preferably, the originating VoiceEngine 32 is located within the range of a local telephone call. The VoiceEngine 32 is the heart of the present invention and makes possible the attainment of the majority of the present invention's objectives. The VoiceEngine 32 is similar in function to the FaxEngine of U.S. patent application Ser. No. 08/585,628, incorporated herein by reference.

The VoiceEngine 32 accomplishes several tasks which can run concurrently in software and hardware. For example, the VoiceEngine 32 might be local to the caller, or it might be local to the receiver of the call. One task is to receive an incoming call from the originating telephone 30. The originating VoiceEngine 32 can either prompt the caller to input the number of a receiving telephone 38, or wait for the caller to input the number without prompting. The originating VoiceEngine 32 then calculates the location of a receiving VoiceEngine 34 using the area code and first three digits of the receiving telephone 38 which are entered by the caller. After calculating the location, the originating VoiceEngine 32 must contact the receiving VoiceEngine 34 which is preferably local to the receiving telephone 38.

It is important to distinguish between a receiving VoiceEngine 34 which is physically closest to the receiving telephone 38, and a receiving VoiceEngine 34 which will incur the smallest long distance telephone charge if no receiving VoiceEngine 34 is a local telephone call to the receiving telephone 38. This distinction is important because the closer VoiceEngine 34 can be more expensive to use. Therefore, determining the location of the receiving VoiceEngine 34 from the area code and first three digits is the best way to insure the lowest charge possible to the caller.

After the originating VoiceEngine 32 contacts the receiving VoiceEngine 34 in anticipation of establishing the telephone call, the complete number of the receiving telephone is passed via the Internet to the receiving VoiceEngine 34. The receiving VoiceEngine 34 then dials the receiving telephone number via, for example, a publicly or privately switched telephone network (PSTN), a cellular switch, PCS, cable telephone or radio 31. At this point in time, the VoiceEngines 32, 34 are prepared to transmit speech or other sounds using simplex or preferably duplex communication between the telephones 30, 38.

The receiving telephone 38 will have no indication that the call is not originating from a telephone strictly via a PSTN 31. However, a service such as caller identification on the receiving telephone 38 will only identify a VoiceEngine 32, 34 instead of the originating telephone 30. This is because the ANI information is not transmitted via the Internet 16. However, it is possible that caller identification information also be transmitted along with the voice transmissions. This would enable the receiving telephone to display the correct caller identification information about the originating telephone 30.

Assuming that the receiving telephone 38 is answered, the VoiceEngines 32, 34 are executing several functions simultaneously to enable voice communication to flow between the caller and the person receiving the call in real time. This differs from the state of the art in two distinct aspects. These are overall bandwidth and latency limitations.

For example, a computer typically has the limitation of a 14.4 or perhaps a 28.8 kbaud modem for transmitting compressed data because the data is transmitted via the PSTN as well as via the Internet. In contrast, the VoiceEngines 32, 34 have no such limitation. Because they are dedicated nodes on the Internet, the VoiceEngines are capable of much higher rates of transfer without the typical 14.4 kbaud limitation. What this does is relax the requirements of data compression. Typically, data compression is necessary in order to meet the requirements of real-time conversation speeds. But with the present invention, compression does not have to be as severe, thus resulting in a higher quality audio throughput. Because the VoiceEngines 32, 34 are dedicated devices, they can also implement compression using dedicated digital signal processing hardware instead of relying on software as is typical of many computer telephone services. Depending upon cost constraints and the number of calls being processed, it is a viable although typically more costly alternative to software compression. Nevertheless, the advantages of faster and more costly hardware compression often outweigh slower software compression speeds.

Latency is a problem for the computer telephones of the state of the art because there are longer built-in delays when the transmission speed is limited to 14.4 kbaud. Typically there can be as much as one and a half seconds of delay between when a person speaks and the other person hears what was said. This can result in choppy, halting sentences because a speaker doesn't know if the other party is about to speak or not. The present invention is clearly at an advantage because only a voice analog signal is traveling via the PSTN instead of digitized data.

The method of the present invention proceeds in the following manner if assuming that duplex communication will occur between the parties. When a person talks into a telephone 30, 38, the analog voice transmission or signal from the originating telephone 30 is transferred via the PSTN 31 to a VoiceEngine 32, 34. The VoiceEngine 32, 34 digitizes the typically analog voice signals via digital signal processing (DSP) means (software or hardware). The digitized signal is then compressed by compression means (software or hardware). The VoiceEngine 32, 34 then prepares the compressed data for transmission via the Internet by creating discrete packets using the TCP/IP protocol. These packets are transmitted via various routes along the Internet to a complementary (the originating or the receiving) VoiceEngine 32, 34. The complementary VoiceEngine 32, 34 then reconstructs the original compressed and digitized message by arranging the packets in the order in which they were transmitted, decompresses the transmitted data and executes a digital to analog conversion in the digital signal processing means to recreate the transmitted audio data.

The process described above is further complicated by the time constraint of making it occur, as far as the caller and receiver can discern, in real time. This is probably why the market has been slow to overcome the technical problems which the method and apparatus of the present invention solves. However, the key to the system which makes the present invention a reality is the creation of VoiceEngines. A dedicated VoiceEngine is able to take incoming audio data (typically a human voice), digitize the sound, compress it for transfer, decompress the data at another VoiceEngine, convert the digitized sound back into an analog signal, and play it back with an insignificant delay. In a preferred embodiment, the VoiceEngine also encrypts the data so that when the conversation is being transmitted via the Internet, it is protected and private.

The VoiceEngines are also capable of multiplexing many voice connections on a single Internet connection. Therefore, a signal is only transmitted via the Internet when speech or other audio data is actually being transmitted to the VoiceEngines.

It should be observed that the receiving telephone 38 need not be a subscriber to the system. It is only necessary to create a database of predefined originating telephone numbers, or enable any telephone number with an accompanying authorized password to make a call.

In summary, the preferred embodiment above describes a system where a non-Internet protocol communicating device is able to transmit analog data via the Internet to another non-Internet protocol communicating device (hereinafter referred to as a non-TCP/IP capable device). The system is able to transmit the data anywhere in the world without incurring long distance telephone charges, and without a complicated calling process typical of state of the art computer telephones. In addition, only the caller must be a subscriber to the Internet telephone system described.

The present invention modifies the preferred embodiment as well. In addition to enabling a person to use a telephone on a switched telephone network 31 to call another telephone on the switched telephone network 31, the caller can also make a call to a computer 40 on the Internet. The method and apparatus for this process differs slightly from that already described. However, it should be apparent that the process requires mapping a location of a computer on the Internet such that an originating VoiceEngine 32 can make contact.

For example, when a caller desires to call a computer on the Internet (actually a person sitting at the computer who can hear the caller's voice), the caller again makes a call to an originating VoiceEngine 32. However, instead of inputting the area code and number of a receiving telephone to the VoiceEngine 32 when prompted, the caller can select from a menu which provides the option of dialing a computer. The computer's location must be determinable in order to successfully complete the call. This can be done by any method known to those skilled in the art. One method is to use an Internet Protocol (IP) address. Most computers are nodes on the Internet. All nodes have an IP address, even if it is a temporary one allocated to a computer when it connects to the Internet via an Internet provider. Therefore, the method begins by requiring the caller to call the originating VoiceEngine 32. The caller can then be prompted to input an IP address. The VoiceEngine 32 then accesses the node at the designated IP address and establishes a link with previously distributed software on the node which is compatible with the originating VoiceEngine 32. Therefore, this process differs from the state of the art in that only one party, the receiving computer 40, must run software and have the necessary accessories for the computer 40 to digitally process, compress and decompress, and encrypt signals. In effect, a non-TCP/IP device 30 (the telephone) is advantageously able to communicate seamlessly with a TCP/IP capable device 40 (the computer).

Another method might be to take advantage of the Domain Name Service (DNS) which is already in place on the Internet for identifying the address of any computer node on the Internet. In this way, the native address mapping abilities of the Internet are used without having to reinvent an existing service.

Specific to a TCP/IP device such as a multimedia computer 40, the VoiceEngines 32, 34 are capable of encoding the data in the Adaptive Differential Pulse code. Modulation (ADPCM) format which can be easily understood by most other multimedia computers 40 which are coupled to the Internet 16. This enables a call to be placed from or to a computer 40 on the Internet 16 which has a sound card, microphone and the software necessary for communicating with a VoiceEngine 32, 34.

There are also variations of the process described above which are provided in alternative embodiments. For example, instead of inputting an IP address of the receiving computer 40, the caller could input an email address. As is known to those skilled in the art, an email address can be queried to determine if the owner of the email address is on the Internet at that time. If the user is at a computer node on the Internet, a telephone call is then initiated between the computer 40 and the origination VoiceEngine 32. It should be observed that there are other ways known to those skilled in the art for the telephone call to be initiated between a person on a switched telephone network and a computer user on the Internet, and these are to be considered to be within the scope of this specification.

The implication of the processes above is that a computer 40 node on the Internet 16 can also make a telephone call via the Internet 16 to a telephone 38 on a switched telephone network 31. This process is even less complicated than the reverse situation already described. This is because it is very simple to locate the receiving telephone 38. For example, the computer node 40 accesses a receiving VoiceEngine 34 by running software which connects the computer to a VoiceEngine database. The software prompts the user to input the area code and telephone number of the receiving telephone 38, and the VoiceEngine database determines which VoiceEngine will act as the receiving VoiceEngine 34 for the call. The receiving VoiceEngine 34 is then instructed to complete the telephone call via the switched telephone network 31 to which it is coupled.

The present invention thus enables communication via the Internet 16 between two non-TCP/IP devices, between a non-TCP/IP device and a TCP/IP device where the non-TCP/IP device initiates the telephone call, or where the TCP/IP device initiates the call. All of the communication will occur without having to pay for long distance telephone charges if both the originating and the receiving VoiceEngines 32, 34 are within a local telephone call of the originating and receiving telephones 30, 38 respectively. This is also true when only a single telephone 30, 38 is part of the process, and the caller or receiver is a computer 40 on the Internet 16.

Of course, there will be times when long distance telephone charges will be unavoidable if an originating or receiving VoiceEngine 32, 34 is not within local telephone calling distance. However, the VoiceEngines 32, 34 will ideally be distributed such that the majority of callers can take advantage of the services provided by the present invention.

While the disclosure has provided overall detail such that someone skilled in the art can practice the invention, there are details specific to the present invention which are advantageous to know in order that the preferred embodiment can be implemented. The detail will be provided by way of flowcharts and block diagrams which mainly describe the internal VoiceEngine processes which are executed during a call.

Figure 3:
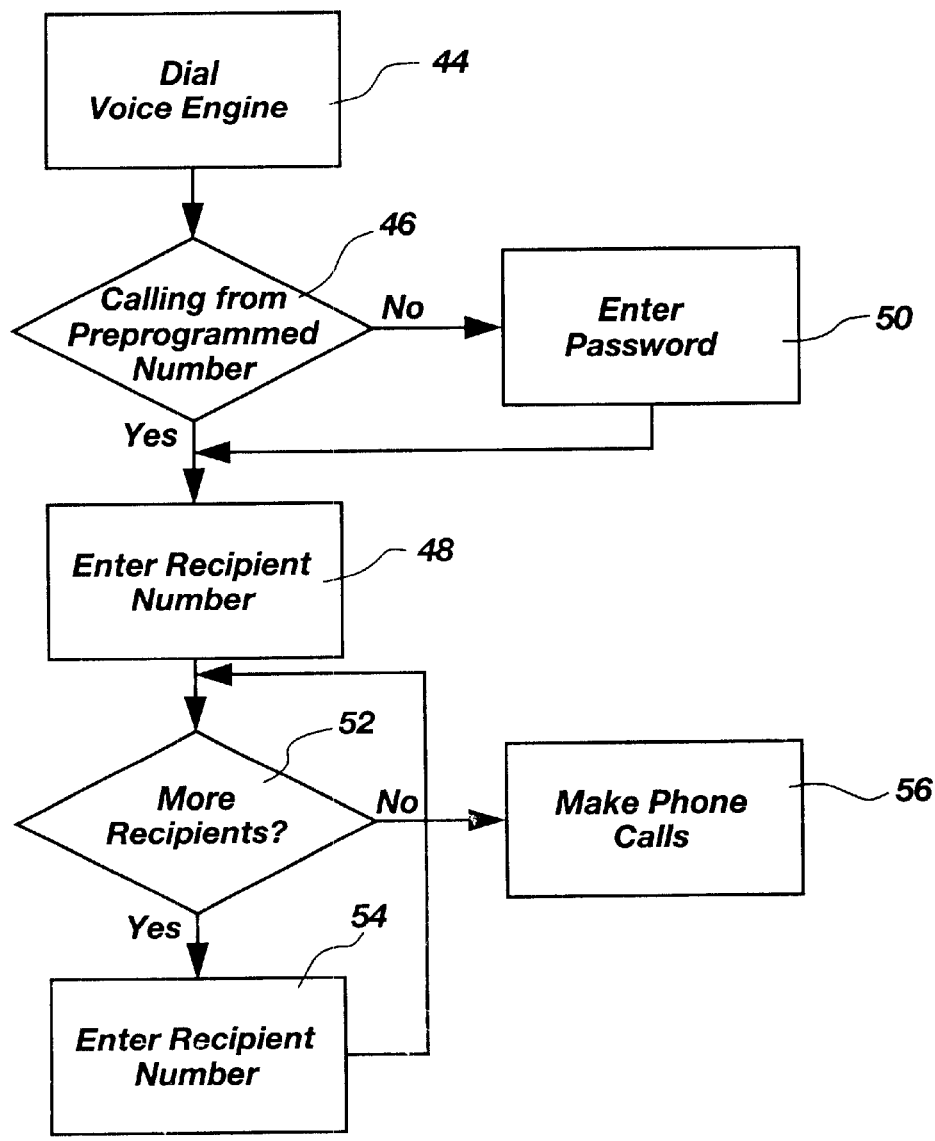
FIG. 3 is a flowchart illustrating the process of sending a voice transmission according to a preferred embodiment of the present invention.

Beginning with FIG. 3, the flowchart describes the processes for the subscriber to follow when dialing a telephone number of a receiving telephone means. As can be seen, the process is only slightly more involved than a direct dialed telephone call today. In fact, with the numerous long distance telephone companies with their complex access codes which have appeared since deregulation of the long distance telephone industry, the process is relatively simple in comparison.

VoiceEngines 32 are accessed by dialing a preferably local VoiceEngine access number which provides switched telephone network access to a VoiceEngine, as shown in step 44. Step 46 is necessary for determining if the subscriber is calling from a preprogrammed and authorized subscriber. If the subscriber is calling from a preprogrammed number, the subscriber only has to enter the receiving telephone number as in step 48. For increased security, the process of the present invention requires password verification if the originating telephone number is not one which the VoiceEngine 32 recognizes, as shown in step 50. After password verification, the subscriber continues to step 48. The process advantageously enables a subscriber to select the option of simultaneously communicating with a plurality of different telephones in steps 52 and 54. If desired, the subscriber simply continues to enter additional destination (receiving) telephone numbers in step 54. This process of adding destination numbers continues until all desired numbers are entered and the phone call(s) are made in step 56.

The entire process differs from regular direct long distance dialing in the best case scenario in that at least two telephone numbers are dialed. The first number a local VoiceEngine access number which is preferably local. The second number is the destination number.

Figure 4:
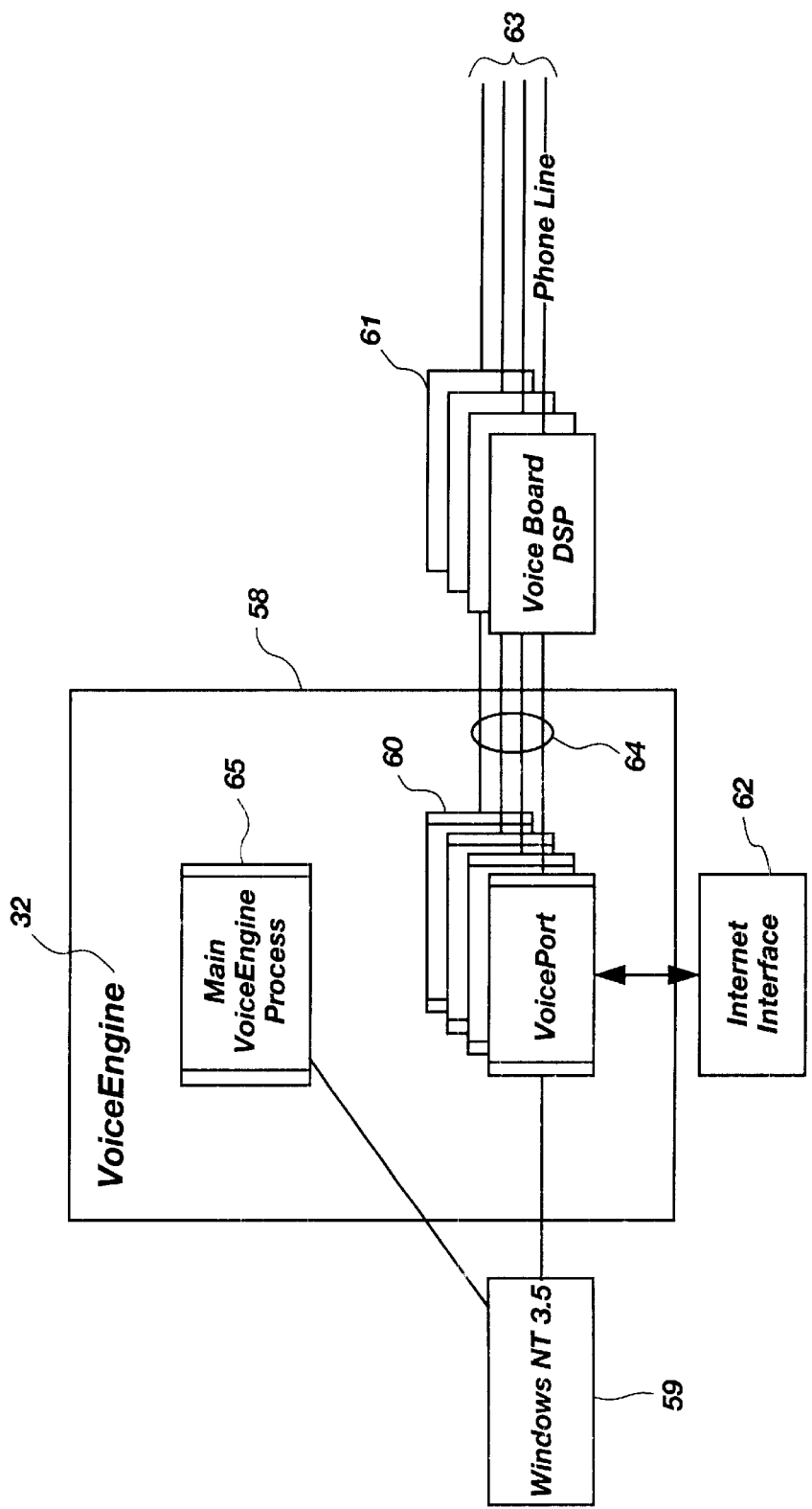
FIG. 4 is a block diagram of the components of a VoiceEngine constructed in accordance with the principles of the present invention.

FIG. 4 is a breakdown in block diagram form of the main hardware components of a VoiceEngine 32 built in accordance with the objects of the present invention. The VoiceEngine 32 can be the originating VoiceEngine 32 as well as the receiving VoiceEngine 34 shown in FIG. 2.

A box 58 is shown drawn around components of the VoiceEngine 32 to illustrate divisions in function. The VoiceEngine itself is a dedicated interrupt driven computer system. In a preferred embodiment, the computer is an Intel-based Complex Instruction Set Computer (CISC) computer system. However, this does not mean that a Reduced Instruction Set Computer (RISC) based system could not be used.

The computer system is controlled by an Operating System, and has been implemented in this invention under Windows NT Version 3.5 (59). Again, this does not preclude the use of other Operating Systems such as UNIX or any of its variant forms. What is important to the present invention is that the Operating System have the capability of providing a multitasking operating environment.

The software which implements the method of the present invention is not to be considered in and of itself as using code structure which is the subject of this patent. Rather, it is the specific functions implemented by the software which are important and are explained hereinafter. The VoiceEngine 32 may be functionally considered as being comprised of at least one VoicePort (Audio Port) 60, at least one Voice Board (Digital Signal Processor DSP) 61, and an Internet Interface 62. The VoicePort 62 provide the VoiceEngine 32 with communication access to switched telephone network lines 63 via the at least one Voice Board 61 for both transmitting and receiving signals (audio data representing such sounds as speech). The VoicePort 60 also provides the VoiceEngine 32 with Internet access for transmitting and receiving signals which are encapsulated as Internet packets for travel via the Internet 16.

The VoicePorts 60 have a dual function as mentioned above. They both send and receive signals via a switched telephone network 31, as well as communicate with the Internet 16 via the Internet interface 62. Communication to a VoicePort 60 from the telephone lines 63 occurs on a thread 64, each thread 64 being capable of both sending and receiving data. The specific processes which take place internal to the VoiceEngine 32 will be described in later flowcharts.

Figure 5:
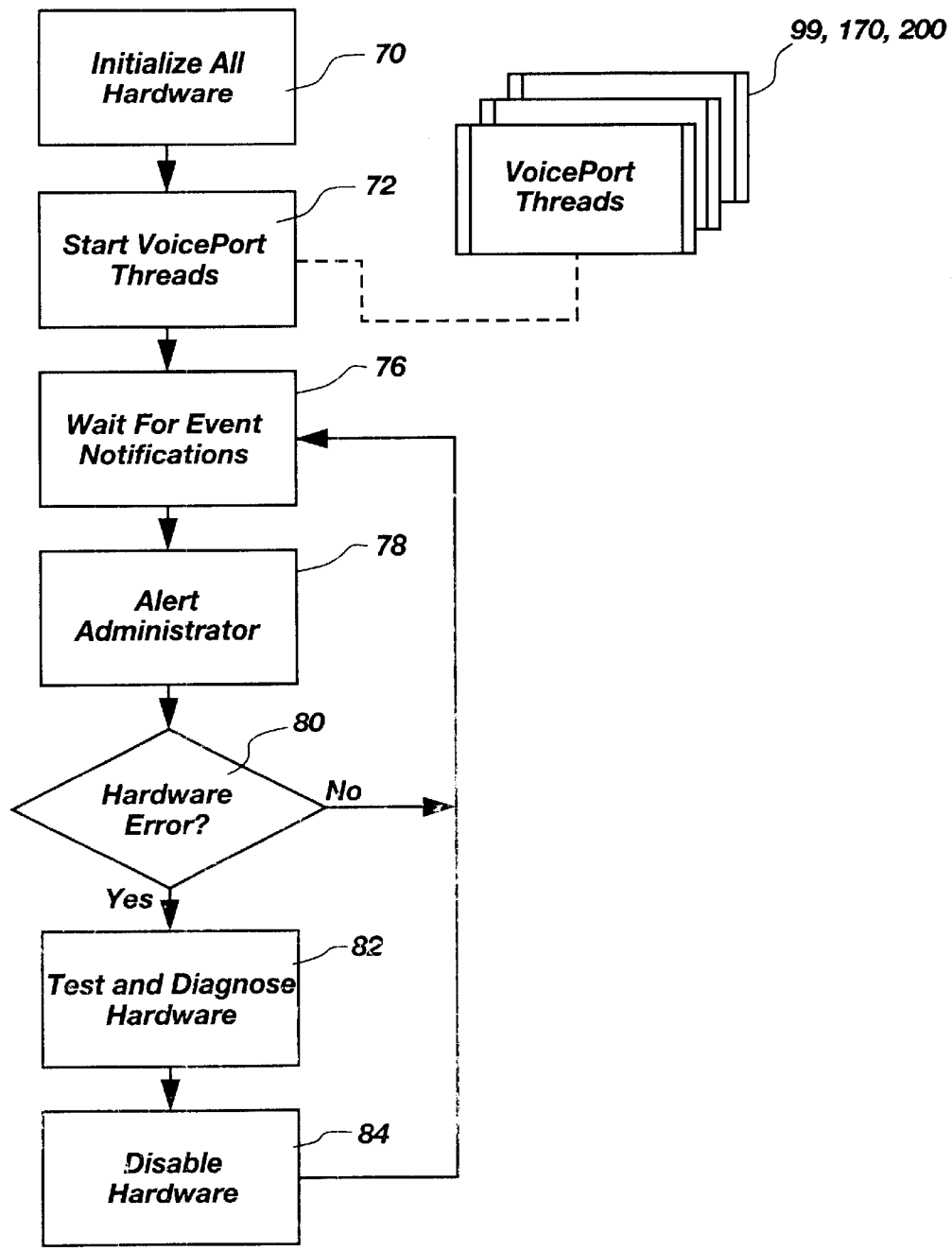
FIG. 5 is a flowchart of the Main VoiceEngine process.

The VoiceEngine 32 is controlled by a Main VoiceEngine Process 65 as shown in FIG. 5. This process 65 enables the VoiceEngine 32 to act as a central processor for the control and management of the VoiceEngine 32 and the requisite sub-processes to be described. Upon startup, the Main VoiceEngine Process 65 initializes all of the hardware as required and is shown as step 70. Step 72 involves activation of the VoicePort threads 64. These threads 64 manage all interface connections 62, 61.

The Main VoiceEngine Process 65 remains in a loop waiting for event notification 76. After receiving notification from any of the processes that have begun, a signal 78 is sent to initiate verification of the notification signal. First, the computer system verifies in step 80 that the notification is valid and not a hardware induced error. This verification 80 can be done in many ways as is known to those skilled in the art and is not the subject of this patent. If there is no error, the process 65 goes back into a loop to wait for another event notification 76.

For example, an event notification alarm might be a system alert indicating that diagnostic software is to be executed. The next step 82 is to test and diagnose hardware. Step 82 could either be accomplished automatically by the system with automatic diagnostic software, or a message or other indicator could alert a computer system administrator that the system needs servicing. If the diagnostic step 82 is automatic, the failed hardware is disabled in step 84 by the computer system so as not to interfere with the computer system operation.

Figure 6:
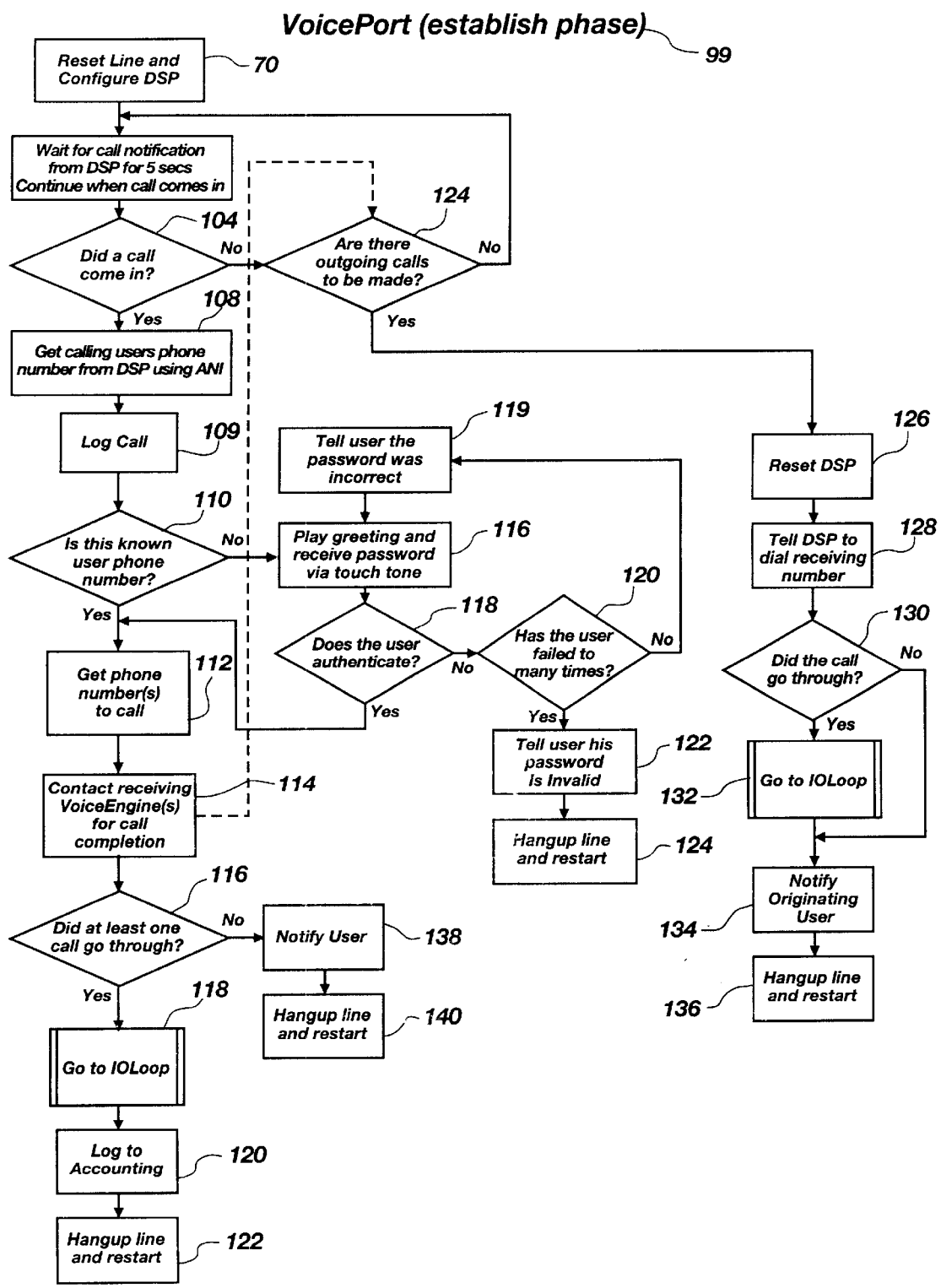
FIG. 6 is a flowchart of the VoicePort establish phase process.

As FIG. 5 indicates, step 72 activates the I/O Loop establish phase 99, the I/O Loop Duplex phase 170 and the I/O Loop Simplex phase 200. The establish phase 99 shown in FIG. 6 is defined as the steps which occur in the receiving VoiceEngine 34 when the VoiceEngine 34 must answer an incoming call from the originating telephone 30, as well as place a call to the receiving telephone 38. Upon notification from the DSP 61 of an incoming call in step 104, the VoicePort thread 64 authenticates the user to the network. To authenticate, the VoicePort thread 64 retrieves the number of the originating telephone 30 from the DSP 61 using ANI in step 108 and the call is logged in step 109. If the number of the originating telephone 30 is a preprogrammed number in a VoiceEngine database as determined in step 110, then the caller is prompted for the destination number of the receiving telephone(s) 38 in step 112.

Alternatively, the process of obtaining the number of the originating telephone 30 by attaching a device to the telephone line 31 of the originating telephone 30. The device would transmit the number of the originating telephone 30 automatically. If the originating telephone 30 is not in the predefined database, then the VoicePOrt thread 64 would play a greeting in step 116 and request a password from the user via, for example, touch tone (DTMF) signals, and the caller would be authenticated using this password. If the caller authenticates properly in step 118, the process continues to step 112. Otherwise the caller is notified that the password is invalid in step 119 and requested to reenter the password. If there are too many failures as determined in step 120, the caller is told that the password is invalid in step 122, and the line is hung up and the process restarted in step 124. However, if no call was successfully completed, the call is notified in step 138 and the telephone line 63 is hung up and the process resets in step 140.

If the caller authenticates properly, the VoicePort thread 64 is then retrieves the number or numbers of the destination telephone(s) in step 112. The user may enter more than one number in order to complete a conference call. The VoiceEngine 32 would then call all the parties to be linked together simultaneously. The receiving VoiceEngine 34 is then contacted in step 114 to complete the call. If at least one call was completed successfully to a receiving telephone 38 as determined in step 116, the process goes to one of the I/O Loop phases 170, 200 in step 118. The call is logged to accounting in step 120 and the line hangs up and the process restarts when the call is complete. In step 122.

The originating VoiceEngine 32 as described above can also act as a receiving VoiceEngine 34. In this case, upon notification of an outgoing call in step 124, the VoiceEngine 32 tells the DSP 61 to reset in step 126 and then to dial the number of the receiving telephone 38 in step 128. If the call is answered as determined in step 130, and a connection is successfully completed, the call enters one of the I/O Loop phases 170, 200 in step 132. Otherwise, the VoiceEngine 32 notifies the originating telephone 30 that the call was not completed in step 134, the information is logged to accounting and the telephone line 31 is hung up and the VoicePOrt establish phase begins anew in step 136.

The I/O Loop phase is separable into two different types of processes, duplex 170 and simplex 200, and controls the input and output of data from the DSP 61 and the Internet 16. This is accomplished by controlling the DSP for both record and play. Thus, the I/O Loop phases 170, 200 can operate the DSP 61 in either a duplex mode to record and play simultaneously, or a simplex mode where data is either recorded or played, but not simultaneously.

Figure 7:
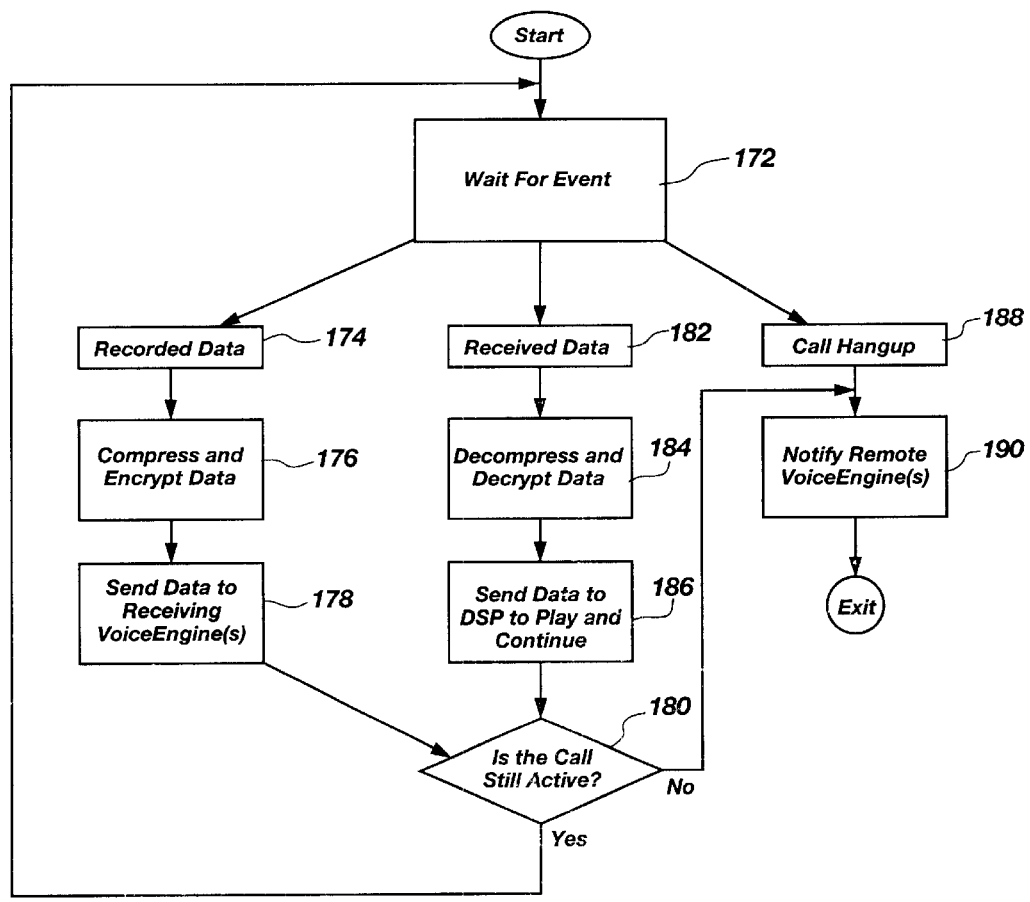
FIG. 7 is a flowchart of the VoicePort (I/O Duplex) send and receive process.

The Duplex mode illustrated in FIG. 7 is the preferred mode of operation of the system and is selectable by requesting the VoicePort thread 64 to operate in duplex. In this mode, the user may both play and record voice/sound data simultaneously from the originating telephone 30 if the VoiceEngine is the originating VoiceEngine 32, or from the receiving telephone 38 if the VoiceENgine is the receiving VoiceEngine 34. Duplex is accomplished by issuing non-blocking calls to the DSP 61 such that it may record data while waiting for data from the PSTN 31. The I/O Loop phase 170 waits for a record or play event to occur and processes accordingly.

The I/O Loop Duplex process 170 begins by waiting for an event to occur as in step 172. There are three events to which it will respond. The first event path is when data is received via the PSTN 31. In this event, the I/O Loop 170 requests the DSP 60 to record data received via the PSTN 31 in step 174. The data is digitized, compressed and encrypted in step 176. At this point, the data can be transmitted after encapsulation using an appropriate Internet protocol and then sent to the receiving VoiceEngine 34 in step 178. After transmission, the process 170 determines whether the call is still active (and therefore further processing will occur) as shown in step 180. If the call is active, the process loops back to step 172 to wait for an event notification. On the other hand, if the call is inactive, the process terminates and the remote VoiceENgine is notified of the break in the connection. In step 190.

The second event path is when the data is being received via the PSTN 31 from a telephone 30, 38. The data is received via the Internet interface 62 and passed to the DSP 61 where it is recorded as shown in step 182. The DSP 61 must decrypt and decompress the data, and finally reverse the digitizing process in step 184 to obtain the original signal. The signal is then played by the DSP 61 by transferring the signal to a telephone 30, 38 via the PSTN 31 in step 186 by issuing a non-blocking call to the DSP 61.

The other event path which can occur is the party on the local telephone hanging up as shown in step 188. When this event occurs, the remote VoiceEngine is notified and the process is reset.

Figure 8:
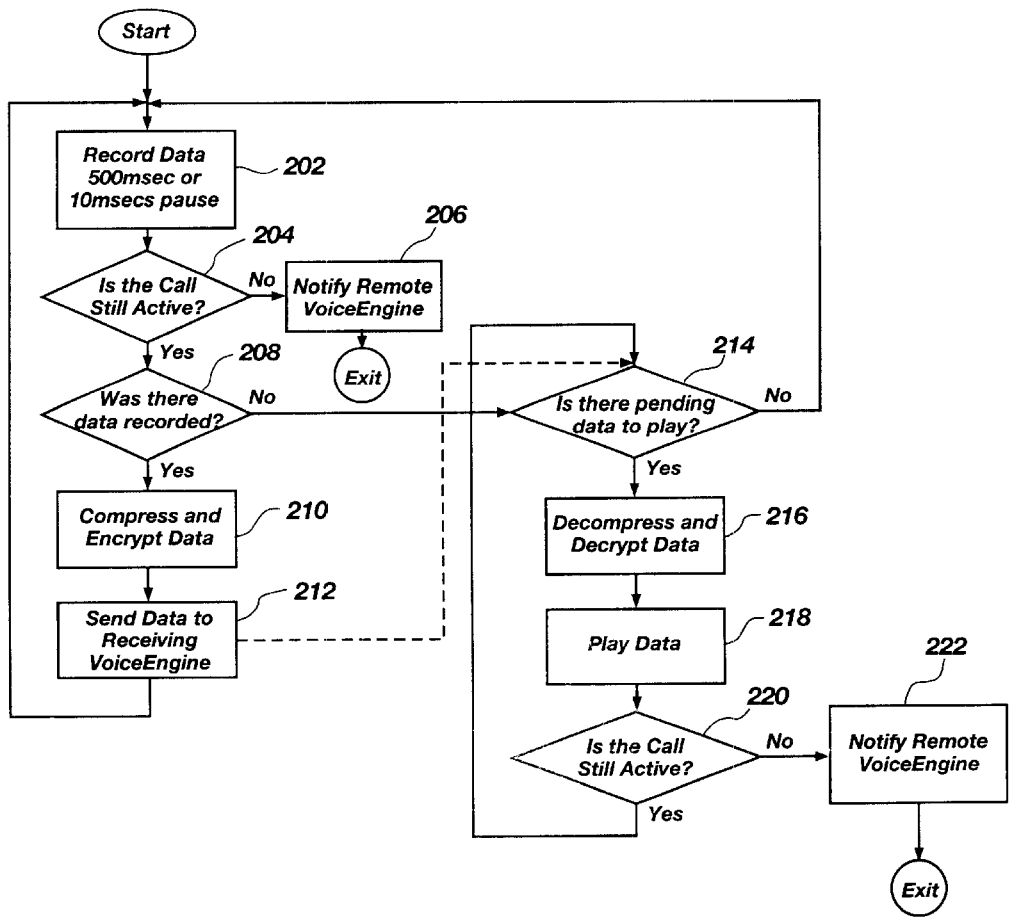
FIG. 8 is a flowchart of the VoicePort (I/O Simplex) send and receive process.

The Simplex mode illustrated in FIG. 8 is not the preferred mode of operation of the system, but is also selectable by requesting the VoicePort thread 64 to operate in simplex. In this mode, the user may either play or record voice/sound data from the originating telephone 30 if the VoiceEngine is the originating VoiceEngine 32, or from the receiving telephone 38 if the VoiceENgine is the receiving VoiceEngine 34. Simplex is accomplished by not issuing non-blocking calls to the DSP 61 such that it may only record or play data. The I/O Loop Simplex process 200 waits for a record or play event to occur and processes accordingly.

The I/O Loop Simplex process 200 begins by either recording data for 500 milliseconds and received from a telephone 30, 38 via the PSTN 31 as shown in step 202, or having no activity occur (silence on the line) for 10 milliseconds. The process then determines whether the call is still active in step 204. If not, the remote VOIceEngine is notified in step 206.

However, if the call is active, the process determines whether data was recorded in step 208. If data was recorded by the DSP 61, the data is digitized, compressed and encrypted in a preferred embodiment as shown in step 210. The data is then transmitted via the Internet 16 to the remote (receiving or originating) VoiceEngine in step 212.

If no data was recorded in step 208, the process verifies whether or not there is any data waiting to be played by the DSP 61 in step 214. If not, the process loops back to step 202. However, if there is data to be played, the data is decrypted, decompressed and the digitizing process is reversed in step 216. The DSP 61 then plays the data in step 218 by sending the signal via the PSTN 31 to the telephone 30, 38. If the call is still active as determined in step 220, the process loops back to step 214 and more data is played.

Otherwise, the remote VoiceEngine is notified in step 222 and the process resets.

Figure 9A:
FIG. 9A is a block diagram of the components where the VoicePort acts as a multiplexer for simultaneously sending a signal to a plurality of VoiceEngines from a single VoiceEngine.

It should be observed that the VoicePort 60 is a multiplexer which gives it the ability to take advantage of a multitasking operating system 59 and execute processes simultaneously. Therefore, in a send mode as shown in FIG. 9A, a plurality of VoiceEngines 34 can receive voice data from a single originating VoiceENgine 32.

Figure 9B:
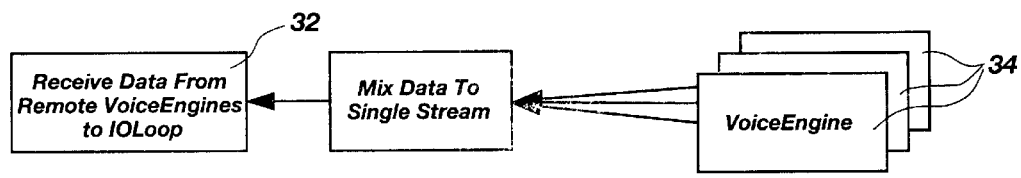
FIG. 9B is a block diagram of the components where the VoicePort acts as a multiplexer for simultaneously receiving a signal from a plurality of VoiceEngines at a single VoiceEngine.

Likewise, in FIG. 9B, the single originating VoiceEngine 32 can receive data simultaneously from a plurality of receiving VoiceEngines 34 which are not operating as originating VoiceEngines 32. The data is mixed to comprise a single stream of data and then sent to the remote VoiceEngine 32.

While the detailed description above has focused on the main feature of the present invention of signal transmission from non-TCP/IP devices via the Internet, there are several other services which the present invention makes both feasible and desirable besides transmission of data between non-TCP/IP devices and TCP/IP devices. These are call forwarding via the Internet, long distance delivery, and the virtual telephone.

Figure 10:
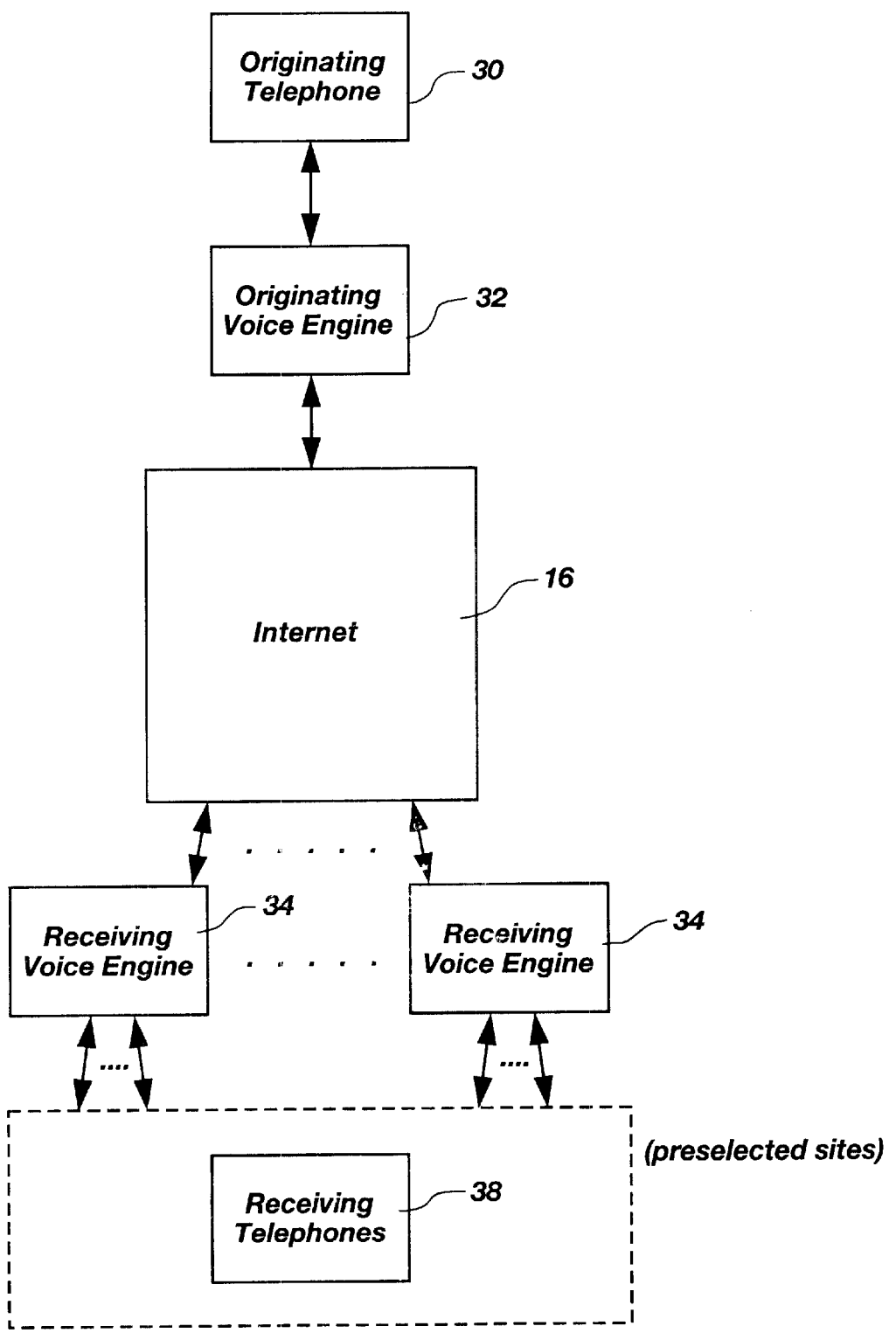
FIG. 10 is a flowchart of the Call Conferencing service provided by the present invention.

The Call Conferencing service is illustrated in FIG. 10, and provides the ability to carry on a conversation with more than one party via the Internet. The VoiceEngine 32 is tasked with distributing the signal to the multiple destinations as entered by the subscriber from the originating telephone 30. The Figure is illustrated as shown to indicate that there may be more than one receiving VoiceEngine 34 in order to reach the plurality of different receiving telephones 38.

Figure 11:
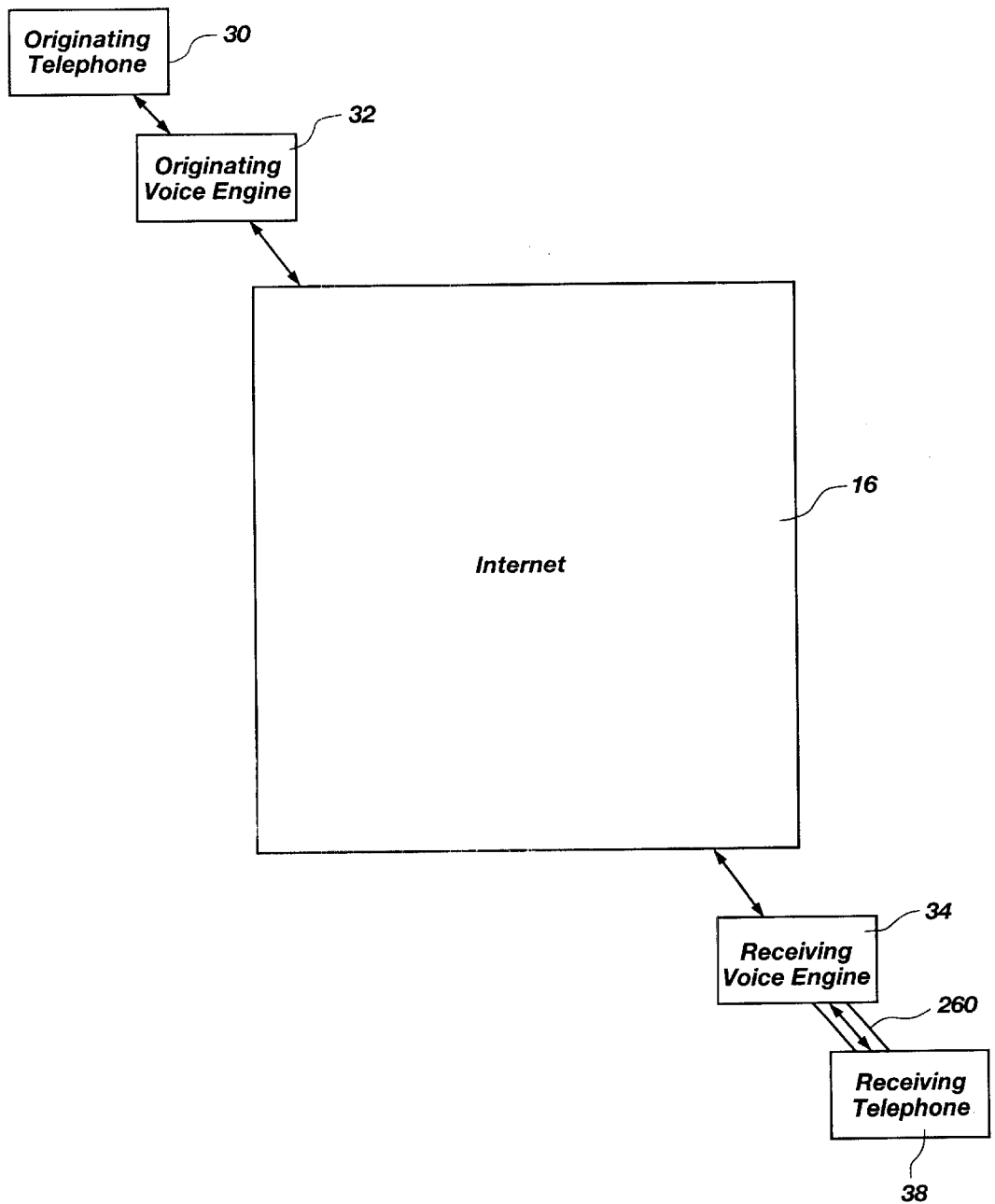
FIG. 11 is a flowchart of the Long Distance Delivery Service provided by the present invention.

The Long Distance Delivery service illustrated in FIG. 11 is for those receiving telephones 38 which are located further than a local switched telephone network call away from all receiving VoiceEngines 34. While this circumstance will ideally be rare, it is certainly possible. Therefore, the present invention will compensate by determining the location of the receiving VoiceEngine 34 which will be billed the lowest rate for making the long distance call 260 to the receiving telephone 38. The long distance telephone charge is further reduced by contracting with long distance telephone providers to obtain a lower cost, high volume contract than can be obtained by single parties. This guarantees to the caller that the signal will be transmitted at a cost that is always less than if the caller were to dial directly, bypassing the Internet 16.

Figure 12:
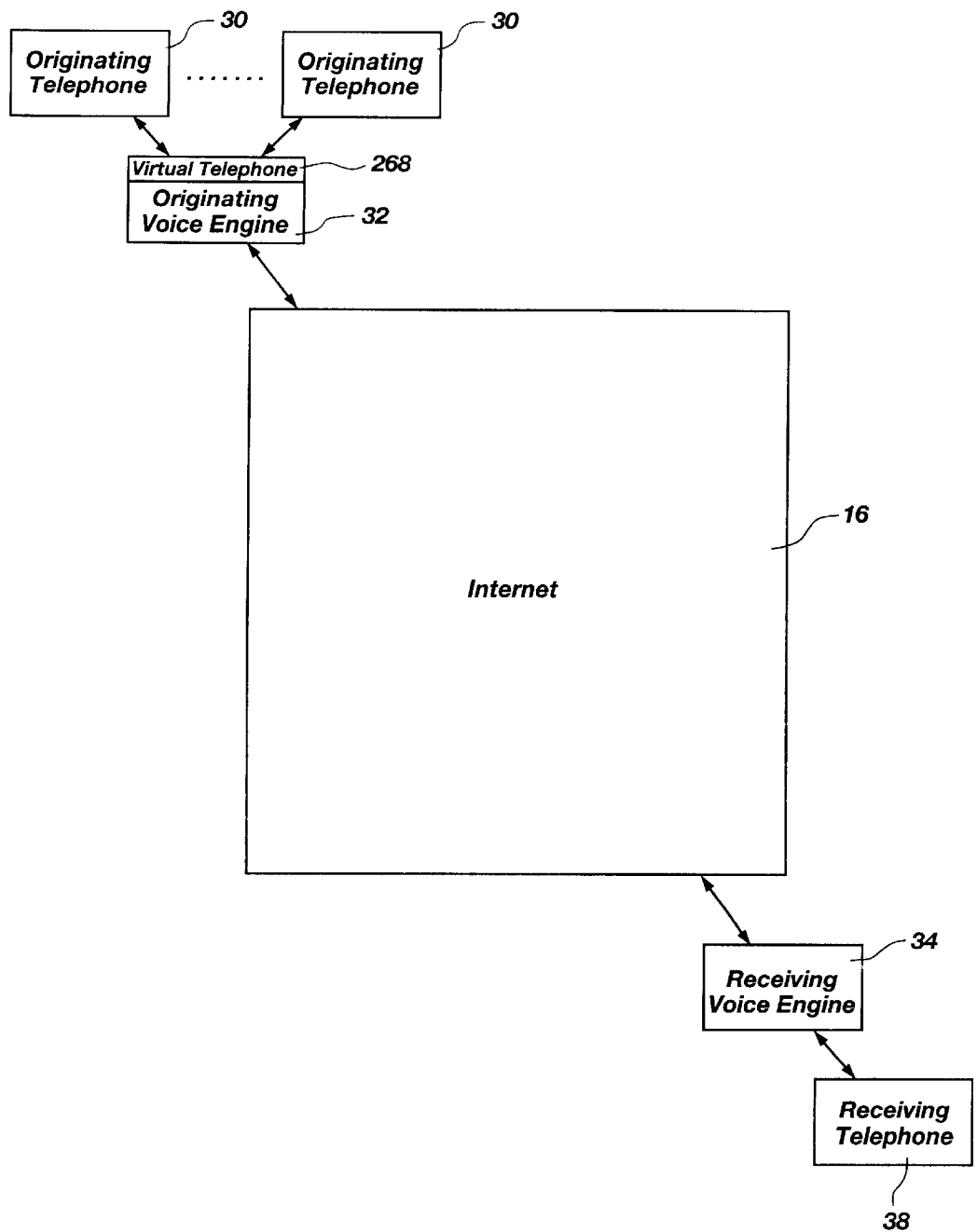
FIG. 12 is a flowchart of the Virtual Telephone service provided by the present invention.

The virtual telephone as illustrated in FIG. 12 provides a subscriber with the ability to be accommodating to clients or other people who either lack the resources for making expensive or significant numbers of long distance telephone calls, or to just provide another convenience. Specifically, a subscriber "creates" a virtual telephone 268 which is a local telephone call from an originating telephone 30. The new telephone 268 is actually just a local VoiceEngine 32. However, instead of requiring the sender to input a long distance telephone number for the receiving telephone 38, the originating VoiceEngine 32 has a system for mapping a telephone phone called by an originating telephone 30 to access the originating VoiceEngine 32. The originating VoiceEngine 32 will then have instructions associated with the telephone by which it was accessed such that it will connect to the subscriber's receiving telephone 38 via the Internet. This way, the originating VoiceEngine 32 does not require pre-programming with every client's originating telephone number.

For example, Business in New York wants to allow a number of small clients in Los Angeles to be able to call by dialing a local Los Angeles telephone number. The local Los Angeles virtual telephone 268 can be called by dialing 555-0123. The VoiceEngine 32 maps any calls to the number as being directed to Business's receiving telephone 38. Thus, when the client's originating telephone 30 calls the virtual telephone 268, the VoiceEngine 32 immediately forwards the signal to Business's receiving telephone 38 in New York. Advantageously, the client only makes a local telephone call, and Business is not charged for the long distance signal transmission.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. An audio transmission system for transmitting voice/sound via the Internet, between at least two devices which are themselves incapable of formatting voice/sound data for Internet transmission, said system comprising:

at least one originating telephone means for transmission of an analog signal representing sound via a first switched telephone network;

at least one originating audio engine means for receiving the analog signal via the first switched telephone network, for verifying that the signal comes from the at least one originating telephone means that is authorized to transmit the signal, for scanning and deactivating malfunctioning audio engine hardware, for obtaining a destination telephone number from the at least one originating telephone means, for digitizing said signal, compressing the signal, encapsulating the signal within at least one Internet packet using an Internet protocol such that the at least one Internet packet is suitable for transmission via the Internet, and for transmitting the at least one Internet packet via the Internet;

at least one receiving audio engine means for receiving the at least one Internet packet transmitted by the originating audio engine means, de-encapsulating the at least one Internet packet to retrieve the signal, de-compressing the signal, converting the signal back to an analog form, and transmitting the analog signal via a second switched telephone network; and at least one receiving telephone means for receiving the analog signal via the second switched telephone network.

2. The system as defined in claim 1 wherein the at least one originating telephone means and the at least one receiving telephone means are telephones designed to bi-directionally communicate audio information via a switched telephone network in a duplex or simplex mode.

3. The system as defined in claim 2 wherein the at least one originating telephone means and the at least one receiving telephone means are telephones which are incapable of encapsulating an analog signal within Internet packets suitable for transmission via the Internet in accordance with an Internet protocol.

4. The system as defined in claim 1 wherein the at least one originating and the at least one receiving telephone means are located at remote distances from each other such that long distance telephone rates would apply for a direct call between them.

5. The system as defined in claim 1 wherein the at least one originating audio engine means has at least one audio port coupled by an audio port thread to the first switched telephone network.

6. The system as defined in claim 1 wherein the at least one receiving audio engine means has at least one audio port coupled by a audio port thread to the second switched telephone network.

7. The system as defined in claim 1 wherein the at least one originating audio engine means has an audio port coupled by an audio port thread to an Internet interface which is coupled to the Internet via a dedicated connection.

8. The system as defined in claim 1 wherein the at least one receiving audio engine means has an audio port coupled by an audio port thread to an Internet interface which is coupled to the Internet via a dedicated connection.

9. The system as defined in claim 1 wherein the at least one originating telephone means and the at least one receiving telephone means are selected from the group consisting of a switched telephone network telephone, a cellular telephone, and a cable telephone.

10. The system as defined in claim 1 wherein the at least one originating audio engine means and the at least one receiving audio engine means are functionally interchangeable, such that the at least one originating audio engine means can perform all the functions of the at least one receiving audio engine means, and vice versa.

11. The system as defined in claim 10 wherein there are a plurality of originating and receiving audio engine means distributed at various dedicated Internet sites.

12. The system as defined in claim 11 wherein the at least one originating and the at least one receiving audio engine means are comprised of:

at least one audio port having at least one audio port thread, said at least one audio port thread providing access to a switched telephone network, and having at least a second audio port threat for providing access to an Internet interface means; and an audio processing means for processing a plurality of first signals received via the switched telephone network and for processing a plurality of second signals received via the Internet in order to prepare the plurality of first signals for transmission via the Internet, and in order to prepare the plurality of second signals for transmission via the switched telephone network; and a main audio engine process operating in audio engine memory which coordinates operation of the at least one audio port and the audio processing means.

13. The system as defined in claim 12 wherein the audio processing means comprises a digital signal processor capable of digitizing an analog signal received via the switched telephone network and compressing the digitized signal for transmission via the Internet.

14. The system as defined in claim 13 wherein the audio processing means comprises a digital signal processor capable of de-compressing a digitized signal received via the Internet and converting the digitized signal to an analog signal for transmission via the switched telephone network.

15. The system as defined in claim 14 wherein said audio engine means is a computer executing a multitasking operating system.

16. The system as defined in claim 14 wherein said multitasking operating system is selected from the group of operating systems consisting of Windows NT, UNIX and other multitasking operating systems.

17. An audio transmission system for transmitting voice/sound via the Internet, said system comprising:

at least one originating telephone means for transmitting an analog signal representing sound via a first switched telephone network;

at least one originating audio engine means for receiving the analog signal via the first switched telephone network, for verifying that the signal comes from the at least one originating telephone means that is authorized to transmit the signal, for scanning and deactivating malfunctioning audio engine means hardware, for obtaining a destination telephone number from the at least one originating telephone means, for digitizing the signal, compressing the signal, encapsulating the signal within at least one Internet packet using an Internet protocol such that the at least one Internet packet is suitable for transmission via the Internet, and for transmitting the at least one Internet packet via the Internet; and a receiving computer means for receiving the at least one Internet packet transmitted by the originating audio engine means, de-encapsulating the at least one Internet packet to retrieve the signal, de-compressing the signal, converting the signal back to an analog signal, and playing the analog signal.

18. A system for transmitting information via the Internet using communication devices which do not transmit information using Internet communication protocols, said system comprising:

at least one originating communication means for transmitting non-Internet encapsulated data via a first switched telephone network;

at least one originating Internet translation engine means for receiving the non-Internet encapsulated data via the switched telephone network, verifying that the signal comes from an authorized originating communication means, for scanning and deactivating malfunctioning originating communication means hardware, for obtaining a destination telephone number from the at least one originating Internet translation engine means, for encapsulating said data into Internet packets using an Internet protocol such that said data is suitable for transmission via the Internet, and for transmitting the Internet packets via the Internet;

at least one receiving Internet engine means for receiving the Internet packets transmitted by the originating Internet translation engine means, de-encapsulating the Internet packet, and transmitting the non-Internet data via a second switched telephone network; and at least one receiving communication means for receiving the non-Internet data via the second switched telephone network.

19. The system as defined in claim 18 wherein the at least one originating communication means and the at least one receiving communication means are selected from non-Internet protocol transmission capable devices designed to simultaneously transmit and receive data via a switched telephone network.

20. The system as defined in claim 19 wherein the at least one originating communication means and the at least one receiving communication means are telephones.

21. The system as defined in claim 18 wherein the at least one originating communication means and the at least one receiving communication means are located at remote distances from each other such that long distance telephone rates would apply for a direct telephone call between them.

22. The system as defined in claim 18 wherein the at least one originating Internet translation engine means and the at least one receiving Internet translation engine means are functionally interchangeable, and thus the at least one originating Internet translation engine means can perform all the functions of the at least one receiving Internet translation engine means, and vice versa.

23. The system as defined in claim 18 wherein there are a plurality of originating and receiving Internet translation engines distributed at various dedicated Internet connection sites.

24. The system as defined in claim 18 wherein the at least one originating Internet translation engine means comprises a digital signal processor capable of digitizing an analog signal received via the switched telephone network and compressing the digitized signal for transmission via the Internet.

25. The system as defined in claim 24 wherein the at least one receiving Internet translation means comprises a digital signal processor capable of de-compressing a digitized signal received via the Internet and converting the digitized signal to an analog signal for transmission via the switched telephone network.

26. A method for transmitting voice/sound via the Internet, the method comprising the steps of:

a) providing an originating telephone means for transmitting an analog signal representing sound via a first switched telephone network, and providing a receiving telephone means for receiving the signal;

b) providing an originating audio engine means for receiving the signal via the first switched telephone network and transmitting the signal via the Internet via the steps of:

1) initializing all audio engine means hardware including audio engine means receive hardware;

2) activating an audio engine means receive event loop which provides an event notification signal when the signal is being received;

3) waiting for the event notification signal;

4) verifying that the audio engine means hardware is not malfunctioning when the event notification signal is received;

5) disabling malfunctioning audio engine means hardware if verification of the audio engine means hardware fails;

6) verifying that the signal being received is coming from the originating telephone means that is authorized to transmit the signal;

7) obtaining at least one telephone number for the receiving telephone means from the originating telephone means;

8) digitizing the signal;

9) compressing the signal;

10) encapsulating the signal within at least one Internet packet such that the signal can be transmitted via the Internet; and 11) transmitting the signal via the Internet;

c) providing a receiving audio engine means for receiving the signal via the Internet, de-encapsulating the signal from the at least one Internet packet, converting the signal to an analog signal, and transmitting the signal via a second switched telephone network; and d) receiving the signal at the receiving telephone means via the second switched telephone network.

27. The method as defined in claim 26 wherein the method comprises the additional step of encrypting the signal before transmitting the signal via the Internet.

28. The method as defined in claim 27 wherein the step of verifying that the signal being received is from an authorized audio engine subscriber includes the steps of:

a) obtaining a telephone number of the originating telephone means;

b) comparing the telephone number of the originating telephone means to a predefined list of authorized audio engine subscribers; and c) requesting a password from the subscriber if the telephone number of the originating telephone means is not on the predefined list, such that audio engine subscribers can use the system from any switched telephone network location.

29. The method as defined in claim 28 wherein the step of obtaining the telephone number of the originating telephone means is determined using automatic number identification (ANI) or DTMF signals.

30. The method as defined in claim 26 wherein the step of obtaining at least one number for a receiving telephone means includes the step of prompting a subscriber at the originating telephone means for additional numbers of receiving telephones such that the signal may be transmitted to a plurality of different receiving telephone means simultaneously.

31. The method as defined in claim 26 wherein the step of encrypting the signal comprises the more specific step of encrypting the signal using an RSA encryption algorithm to protect the confidentiality of the signal.

32. The method as defined in claim 26 wherein the step of encapsulating the signal within at least one Internet packet such that the signal can be transmitted via the Internet includes the step of encapsulating the signal within at least one Internet packet which is prepared in accordance with an accepted Internet protocol.

33. The method as defined in claim 32 wherein the step of encapsulating the signal within at least one Internet packet prepared in accordance with an accepted Internet protocol comprises the more specific step of using Transport Connect Protocol/Internet Protocol (TCP/IP).

34. The method as defined in claim 26 wherein the step of transmitting the signal via the Internet to a receiving audio engine means includes the further step of determining which receiving audio engine means should receive the signal by locating a receiving audio engine means which is preferably a local telephone call from the receiving telephone means.

35. The method as defined in claim 34 wherein the step of locating a receiving audio engine means which is preferably a local telephone call from the receiving telephone means comprises the additional step of locating an audio engine means which can make the least expensive long distance telephone call to the receiving telephone means if no receiving audio engine means can be located which is a local telephone call from the receiving telephone means.

36. The method as defined in claim 26 wherein the step of providing a receiving audio engine means for transmitting the signal from the receiving audio engine means to the receiving telephone means via the second switched telephone network comprises the more specific step of initiating a main audio engine transmit process, said process including the steps of:

a) initializing all audio engine means hardware including audio engine means transmission hardware;

b) activating an audio engine send event loop which provides an event notification signal when a signal is to be transmitted;

c) waiting for the event notification signal;

d) verifying that the audio engine means hardware is not malfunctioning when the event notification signal is received; and e) disabling malfunctioning audio engine means hardware if verification of the hardware fails.

37. The method as defined in claim 36 wherein the step of activating the audio engine send event loop which provides an event notification signal indicating a signal is to be transmitted from the receiving audio engine means to the receiving telephone means via the switched telephone network includes the further steps of:

a) verifying that the signal being received via the Internet is coming from an authorized audio engine subscriber;

b) reassembling the at least one Internet packet into the signal;

c) obtaining at least one receiving telephone number from the signal;

d) opening a connection to the receiving telephone means via the second switched telephone network;

e) decrypting the signal if the connection to the receiving telephone means is successful; and f) transmitting the signal to the receiving telephone means.

38. The method as defined in claim 26 wherein the step of obtaining at least one receiving telephone number from the originating telephone means includes the further step of obtaining a plurality of numbers for receiving telephone means provided by the subscriber at the originating telephone means such that the signal is transmitted simultaneously to all the receiving telephone means whose telephone numbers are provided by the subscriber.

39. The method as defined in claim 26 wherein the step of obtaining at least one receiving telephone number from the originating telephone means includes the further step of pre-programming the originating audio engine means such that the signal is transmitted to a plurality of receiving telephone means whose telephone numbers have been previously provided to the originating audio engine means.

40. The method as defined in claim 26 wherein the steps of providing a receiving audio engine means for receiving the signal via the Internet and transmitting the signal via a second switched telephone network to a receiving telephone means via the second switched telephone network includes the further step of redirecting the signal from the receiving telephone means to a new receiving telephone means when the system is directed to reroute signal temporarily to a new receiving telephone means.

41. The method as defined in claim 26 wherein the step of providing an originating telephone means for transmitting a signal via a first switched telephone network and providing an originating audio engine means for receiving the signal via the first switched telephone network and transmitting the signal via the Internet comprises the further step of creating a virtual telephone means such that a subscriber using the originating telephone means calls a mapped telephone number of the originating audio engine means and the receiving audio engine means automatically transmits all signals transmitted to the mapped telephone number to a predefined receiving telephone means via the Internet.

42. A method for transmitting data from a device which transmits data via a switched telephone network, but which does not encapsulate data within Internet packets for transmission via the Internet, said method comprising the steps of:

a) providing an originating communication engine means which communicates via a first switched telephone network;

b) providing a transmitting Internet engine means for receiving data from the originating communication engine means via the first switched telephone network and for transmitting said data via the Internet by the steps of:

1) verifying that the data comes from the originating communication engine means that is authorized to transmit the data;
2) scanning and deactivating malfunctioning originating communication engine means hardware;
3) obtaining a destination telephone number from the at least one originating communication engine means;
4) digitizing the data;
5) compressing the data;
6) encapsulating the data within at least one Internet packet using an Internet protocol such that the at least one Internet packet is suitable for transmission via the Internet; and
7) transmitting the at least one Internet packet via the Internet;

c) providing a receiving Internet engine means for receiving the at least one Internet packet from the Internet, de-encapsulating the data from the at least one Internet packet, and for transmitting said data via a second switched telephone network; and d) receiving the data at the receiving communication engine means from the receiving Internet engine means.

43. The method as defined in step 42 wherein the step of transmitting the data via the Internet includes the step of encapsulating the data within at least one Internet packet in accordance with an Internet protocol such that the signal can be transmitted via the Internet.

44. A method for transmitting voice/sound via the Internet, the method comprising the steps of:

a) providing an originating telephone means for transmitting an analog signal representing sound via a first switched telephone network;

b) providing an originating audio engine means for receiving the signal via the first switched telephone network, verifying that the signal comes from the originating telephone means that is authorized to transmit the signal, scanning and deactivating malfunctioning originating audio engine means hardware, obtaining a destination telephone number from the originating telephone means, digitizing the signal, compressing the signal, encapsulating the signal within at least one Internet packet using an Internet protocol such that the at least one Internet packet is suitable for transmission via the Internet, and transmitting the at least one Internet packet via the Internet; and c) providing a receiving computer means for receiving the at least one Internet packet via the Internet, de-encapsulating to recover the signal, decompressing and converting back to the analog signal and audibly playing the analog signal.

* * * * *